United States Patent
Tian et al.

(10) Patent No.: US 10,394,572 B2
(45) Date of Patent: Aug. 27, 2019

(54) POWER ADAPTER AND METHOD FOR UPGRADING THE POWER ADAPTER

(71) Applicant: GUANGDONG OPPO MOBILE TELECOMMUNICATIONS CORP., LTD., Dongguan (CN)

(72) Inventors: Chen Tian, Dongguan (CN); Jialiang Zhang, Dongguan (CN)

(73) Assignee: Guangdong Oppo Mobile Telecommunications Corp. Ltd., Dongguan, Guangdong (CN)

( * ) Notice: Subject to any disclaimer, the term of this patent is extended or adjusted under 35 U.S.C. 154(b) by 0 days.

(21) Appl. No.: 15/324,631

(22) PCT Filed: Sep. 24, 2015

(86) PCT No.: PCT/CN2015/090619
§ 371 (c)(1),
(2) Date: Oct. 13, 2017

(87) PCT Pub. No.: WO2017/049550
PCT Pub. Date: Mar. 30, 2017

(65) Prior Publication Data
US 2018/0024842 A1 Jan. 25, 2018

(51) Int. Cl.
*G06F 8/65* (2018.01)
*H04B 5/00* (2006.01)
(Continued)

(52) U.S. Cl.
CPC ........... *G06F 9/4411* (2013.01); *G06F 8/60* (2013.01); *G06F 8/71* (2013.01); *G06F 9/452* (2018.02); *G06F 11/0748* (2013.01); *H04B 1/54* (2013.01)

(58) Field of Classification Search
CPC .................................. H04W 4/80; H04B 5/00
See application file for complete search history.

(56) References Cited

U.S. PATENT DOCUMENTS 5,822,692 A * 10/1998 Krishan .................... G06F 8/65
455/419
8,332,836 B2 * 12/2012 Jamerson ............ H01M 2/1066
717/172
(Continued)

FOREIGN PATENT DOCUMENTS

CN         101656949 A        2/2010
CN         102867400 A        1/2013
(Continued)

OTHER PUBLICATIONS

TW Office Action in connection with corresponding TW Application No. 105118555, dated Nov. 20, 2017, 6 pages.
(Continued)

*Primary Examiner* — Cindy Trandai
(74) *Attorney, Agent, or Firm* — Young Basile Hanlon & MacFarlane, P.C.

(57) ABSTRACT

The embodiments of the present disclosure provide a power adapter and a method for upgrading the power adapter. The power adapter includes a radio frequency unit configured to receive firmware upgrade data from a server via an antenna, a micro controller unit configured to upgrade a firmware of the micro controller unit according to the firmware upgrade data received by the radio frequency unit, and a charging interface configured to charge a terminal. In embodiments of the present disclosure, the power adapter includes the radio frequency unit and the antenna, thus the power adapter can communicate with the server via a network, so as to obtain updated firmware upgrade data to upgrade the firmware. That is, in the embodiments of the present disclosure, the firmware of the MCU of the power adapter is upgraded via a network.

16 Claims, 4 Drawing Sheets

(51) Int. Cl.
*G06F 9/4401* (2018.01)
*G06F 8/60* (2018.01)
*H04B 1/54* (2006.01)
*G06F 11/07* (2006.01)
*G06F 9/451* (2018.01)
*G06F 8/71* (2018.01)

(56) References Cited

U.S. PATENT DOCUMENTS

| | | | |
|---|---|---|---|
| 9,128,796 B2* | 9/2015 | Chitre | G06F 8/65 |
| 9,431,831 B1* | 8/2016 | Richardson | G06F 1/263 |
| 9,558,353 B2* | 1/2017 | Marino | G06F 21/56 |
| 9,620,001 B2* | 4/2017 | Brunolli | G08C 17/02 |
| 9,667,074 B2* | 5/2017 | Farhi | H02J 7/0004 |
| 2003/0224761 A1* | 12/2003 | Goto | G06F 8/65 |
| | | | 455/412.1 |
| 2005/0028001 A1* | 2/2005 | Huang | H04L 63/06 |
| | | | 726/2 |
| 2007/0032274 A1* | 2/2007 | Lee | H04R 1/1025 |
| | | | 455/575.2 |
| 2007/0078957 A1* | 4/2007 | Ypya | G06F 21/10 |
| | | | 709/222 |
| 2007/0222681 A1* | 9/2007 | Greene | H01M 2/1022 |
| | | | 343/700 MS |
| 2008/0059958 A1* | 3/2008 | Bolanowski | G06F 8/65 |
| | | | 717/168 |
| 2008/0222431 A1 | 9/2008 | Paniagua et al. | |
| 2009/0111378 A1* | 4/2009 | Sheynman | H04W 8/005 |
| | | | 455/41.1 |
| 2009/0144455 A1 | 6/2009 | Chen | |
| 2009/0177906 A1* | 7/2009 | Paniagua, Jr. | G06F 1/26 |
| | | | 713/340 |
| 2009/0254897 A1* | 10/2009 | Segalov | G06F 8/68 |
| | | | 717/173 |
| 2010/0175062 A1* | 7/2010 | Kim | G06F 8/65 |
| | | | 717/173 |
| 2010/0213891 A1 | 8/2010 | Nishikawa et al. | |
| 2010/0317326 A1* | 12/2010 | Park | H04L 51/063 |
| | | | 455/412.1 |
| 2011/0103609 A1* | 5/2011 | Pelland | H04M 1/0254 |
| | | | 381/74 |
| 2012/0295634 A1* | 11/2012 | Kim | H02J 7/025 |
| | | | 455/456.1 |
| 2012/0311555 A1 | 12/2012 | Nijenkamp | |
| 2012/0317224 A1* | 12/2012 | Caldwell | H04L 45/745 |
| | | | 709/217 |
| 2013/0084800 A1* | 4/2013 | Troberg | H04B 5/0037 |
| | | | 455/41.1 |
| 2013/0157637 A1* | 6/2013 | Bos | H04W 8/245 |
| | | | 455/418 |
| 2013/0185548 A1* | 7/2013 | Djabarov | H04L 41/082 |
| | | | 713/2 |
| 2013/0217332 A1* | 8/2013 | Altman | H04H 60/90 |
| | | | 455/41.2 |
| 2013/0249479 A1* | 9/2013 | Partovi | H02J 7/025 |
| | | | 320/108 |
| 2013/0257365 A1* | 10/2013 | Redding | H02J 5/005 |
| | | | 320/108 |
| 2014/0068597 A1* | 3/2014 | Hirahara | G06F 8/65 |
| | | | 717/173 |
| 2014/0089446 A1* | 3/2014 | Mallikarjunan | H04L 65/4076 |
| | | | 709/212 |
| 2014/0167688 A1* | 6/2014 | Doyle | H02J 7/0004 |
| | | | 320/108 |
| 2014/0312848 A1* | 10/2014 | Alexander | H02J 7/0013 |
| | | | 320/134 |
| 2014/0380029 A1* | 12/2014 | Tokuda | H04M 1/72569 |
| | | | 713/1 |
| 2015/0002088 A1* | 1/2015 | D'Agostino | H02J 7/0044 |
| | | | 320/108 |
| 2015/0066640 A1* | 3/2015 | Jung | G06Q 30/0251 |
| | | | 705/14.49 |
| 2015/0108901 A1* | 4/2015 | Greene | H05B 37/0218 |
| | | | 315/149 |
| 2015/0188352 A1* | 7/2015 | Peek | H02J 7/0042 |
| | | | 320/108 |
| 2015/0195013 A1* | 7/2015 | Mach | H04B 5/0037 |
| | | | 307/104 |
| 2015/0221414 A1* | 8/2015 | Matsuoka | G06F 1/1632 |
| | | | 174/70 R |
| 2015/0326060 A1* | 11/2015 | Young | H02J 7/0044 |
| | | | 320/108 |
| 2016/0036814 A1* | 2/2016 | Conrad | H04L 63/0876 |
| | | | 713/171 |
| 2016/0126775 A1* | 5/2016 | Park | H02J 50/10 |
| | | | 320/108 |
| 2016/0276873 A1* | 9/2016 | Ben Hanoch | H02J 50/12 |
| 2017/0010881 A1* | 1/2017 | Kawazu | G06F 8/65 |
| 2018/0081417 A1* | 3/2018 | Chan | G06F 1/3212 |

FOREIGN PATENT DOCUMENTS

| | | |
|---|---|---|
| CN | 103645921 A | 3/2014 |
| CN | 104065724 A | 9/2014 |
| CN | 104199706 A | 12/2014 |
| CN | 204012815 U | 12/2014 |
| CN | 104375855 A | 2/2015 |
| EP | 2348405 A1 | 7/2011 |
| TW | 201229903 A | 7/2012 |

OTHER PUBLICATIONS

Extended European search report issued in corresponding European application No. 15895853.8 dated Mar. 14, 2018.

* cited by examiner

POWER ADAPTER AND METHOD FOR UPGRADING THE POWER ADAPTER

FIELD OF THE TECHNICAL

The present disclosure relates to communication field, and particularly to a power adapter and a method for upgrading the power adapter.

BACKGROUND

Typical adapters are not programmable, and have sole function. If the functionality of the power adapter needs to be changed, hardware of the power adapter needs to be changed, which results in difficult change and high cost for change.

Smart power adapters, for example, the power adapter of OPPO which supports VOOC quick charging, includes a micro controller unit (MCU), and can adjust self work modes according to self status. The MCU is programmable. If the power adapter needs to be upgraded, that is, the work modes of the power adapter need to be adjusted, programs need to be downloaded and installed in the MCU.

SUMMARY

The embodiments of the present disclosure provide a power adapter and a method for upgrading the power adapter, which can upgrade a firmware of the power adapter flexibly.

In a first aspect, a power adapter is provided. The power adapter comprises a radio frequency unit configured to receive firmware upgrade data from a server via an antenna, a micro controller unit configured to upgrade a firmware of the micro controller unit according to the firmware upgrade data received by the radio frequency unit, and a charging interface configured to charge a terminal.

In combination with the first aspect, in a possible implementation manner of the first aspect, the radio frequency unit is configured to transmit a first request message for requesting the firmware upgrade data to the server via the antenna, and receive the firmware upgrade data corresponding to the first request message from the server.

In combination with the first aspect, in a possible implementation manner of the first aspect, the radio frequency unit is configured to obtain update firmware version information from the server via the antenna. The micro controller unit is configured to determine whether to upgrade the firmware according to the update firmware version information. The radio frequency unit is configured to transmit the first request message to the server via the antenna when the micro controller unit determines to upgrade the firmware.

In combination with the first aspect, in a possible implementation manner of the first aspect, the micro controller unit is configured to determine to upgrade the firmware when it is determined that a version level of the firmware is lower than that of the update firmware version information, and determine not to upgrade the firmware when it is determined that the version level of the firmware is not lower than that of the update firmware version information.

In combination with the first aspect, in a possible implementation manner of the first aspect, the radio frequency unit is configured to transmit a second request message for querying firmware version information to the server via the antenna to obtain the update firmware version information.

In combination with the first aspect, in a possible implementation manner of the first aspect, the radio frequency unit is configured to transmit the received firmware upgrade data to the server via the antenna, so as to cause the server to perform data verification. The radio frequency unit is further configured to receive an indication message from the server, and the indication message is configured to indicate that the data verification is successful.

In a second aspect, a method for upgrading a power adapter is provided. The power adapter comprises a radio frequency unit, an antenna, a micro controller unit, and a charging interface. The method comprises: receiving, by the radio frequency unit and the antenna of the power adapter, firmware upgrade data from a server; and processing, by the micro controller unit of the power adapter, the firmware upgrade data to upgrade a firmware of the micro controller unit.

In combination with the second aspect, in a possible implementation manner of the second aspect, receiving, by the radio frequency unit and the antenna of the power adapter, the firmware upgrade data from the server comprises: transmitting, by the radio frequency unit and the antenna of the power adapter, a first request message for requesting the firmware upgrade data to the server; and receiving, by the radio frequency unit and the antenna of the power adapter, the firmware upgrade data corresponding to the first request message from the server.

In combination with the second aspect, in a possible implementation manner of the second aspect, transmitting, by the radio frequency unit and the antenna of the power adapter, the first request message for requesting the firmware upgrade data to the server comprises: obtaining, by the radio frequency unit and the antenna of the power adapter, update firmware version information from the server; determining, by the power adapter, whether to upgrade the firmware according to the update firmware version information; and transmitting, by the radio frequency unit and the antenna of the power adapter, the first request message to the server when the power adapter determines to upgrade the firmware.

In combination with the second aspect, in a possible implementation manner of the second aspect, determining, by the power adapter, whether to upgrade the firmware according to the update firmware version information comprises: determining to upgrade the firmware when it is determined that a version level of the firmware is lower than that of the update firmware version information; and determining not to upgrade the firmware when it is determined that the version level of the firmware is not lower than that of the update firmware version information.

In combination with the second aspect, in a possible implementation manner of the second aspect, obtaining, by the radio frequency unit and the antenna of the power adapter, the update firmware version information from the server comprises: transmitting, by the radio frequency unit and the antenna of the power adapter, a second request message for querying firmware version information to the server; and obtaining, by the radio frequency unit and the antenna of the power adapter, the update firmware version information.

In combination with the second aspect, in a possible implementation manner of the second aspect, the method further comprises: transmitting, by the radio frequency unit and the antenna of the power adapter, the received firmware upgrade data to the server, so as to cause the server to perform data verification; and receiving, by the radio frequency unit and the antenna of the power adapter, an indication message from the server, wherein the indication message is configured to indicate that the data verification is successful.

Based on the above technical solutions, in embodiments of the present disclosure, the power adapter includes the radio frequency unit and the antenna, thus the power adapter can communicate with the server via a network, so as to obtain updated firmware upgrade data to upgrade the firmware. That is, in the embodiments of the present disclosure, the firmware of the MCU of the power adapter is upgraded via a network, thus a problem of the present technology that the power adapter needs to be returned to a factory for repairing when a software bug occurs can be avoided, which can enhance user satisfaction.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION OF ILLUSTRATED EMBODIMENTS

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

It can be understood that in embodiments of the present disclosure a power adapter refers to a smart power adapter. The power adapter can adjust self work modes according to self status. The power adapter includes a MCU. It can be understood that the MCU is programmable and can be programmed via software, that is, different functions of the MCU can be realized by modifying program codes of the MCU.

It can be further understood that in embodiments of the present disclosure the power adapter includes a charging interface configured to charge a terminal, for example, a mobile phone.

In embodiments of the present disclosure, the power adapter includes a radio frequency unit and an antenna. The power adapter communicates with a server via the radio frequency unit and the antenna.

Figure 1:
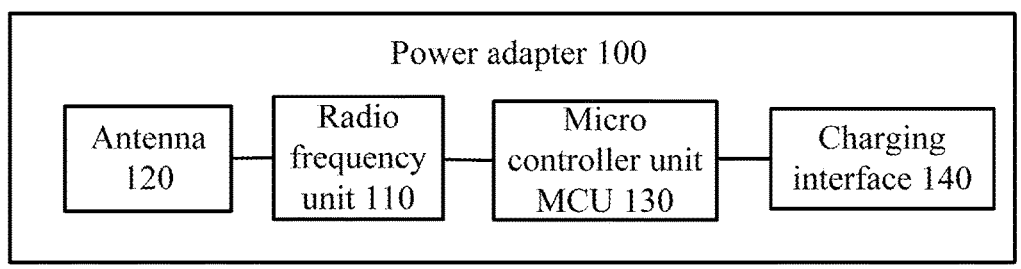
FIG. 1 is a schematic block diagram of a power adapter in accordance with an embodiment of the present disclosure.

FIG. 1 illustrates a power adapter 100 in accordance with an embodiment of the present disclosure. The power adapter 100 includes a radio frequency unit 110, an antenna 120, a MCU 130, and a charging interface 140.

The radio frequency unit 110 is configured to receive firmware upgrade data from a server via the antenna 120.

Specifically, in the embodiment of the present disclosure, the firmware refers to a MCU firmware, that is, the firmware upgrade data is MCU firmware upgrade data.

The MCU 130 is configured to upgrade firmware of the MCU 130 according to the firmware upgrade data received by the radio frequency unit 110.

The charging interface 140 is configured to charge a terminal.

Specifically, the power adapter stores the received firmware upgrade data in a corresponding site to realize upgrade of the firmware.

It can be understood that in the embodiment of the present disclosure the server refers to a server which can provide network service for the power adapter. Specifically, the server can be an existing server, and the embodiment of the present disclosure will not limit the server to be a specific server.

It can be understood that the MCU 130 communicates with the radio frequency unit 110 via baseband signals. Radio signals generated by the radio frequency unit 110 are transmitted via the antenna 120.

In the embodiment of the present disclosure, the power adapter includes the radio frequency unit and the antenna, thus the power adapter can communicate with the server via a network, so as to obtain updated firmware upgrade data to upgrade the firmware. That is, in the embodiment of the present disclosure, the firmware of the MCU of the power adapter is upgraded via a network, thus a problem of the present technology that the power adapter needs to be returned to a factory for repairing when a software bug occurs can be avoided, which can enhance user satisfaction.

It can be understood that in the embodiment of the present disclosure, the firmware of the MCU of the power adapter can be upgraded online, which is similar to that a mobile phone is upgraded via over-the-air (OTA) technology. It can be understood that the OTA upgrade is a standard software upgrade manner provided by the Android system, and may be a lossless upgrade system. For the OTA upgrade, an OTA upgrade pack is automatically downloaded via a network, for example WIFI or 3G network, to perform automatic upgrade operation. For the OTA upgrade, the OTA upgrade pack can also be downloaded into a memory card to perform upgrade operation, for example, the OTA upgrade pack is downloaded into a secure digital memory card to perform upgrade operation.

Optionally, in the embodiment of the present disclosure, the radio frequency unit 110 is configured to transmit a first request message for requesting the firmware upgrade data to the server via the antenna 120, and receive the firmware upgrade data corresponding to the first request message from the server.

Specifically, for example, when the power adapter requests the firmware upgrade data corresponding to the latest firmware version number from the server, according to the request from the power adapter, the server returns the firmware upgrade data corresponding to the latest firmware version number to the power adapter.

Optionally, in the embodiment of the present disclosure, the radio frequency unit 110 is configured to obtain update firmware version information from the server via the antenna 120.

Specifically, in the embodiment of the present disclosure, the firmware version information is a firmware version number. In the embodiment of the present disclosure, the update firmware version information is the latest MCU firmware version number from the server.

The server can automatically transmit the update firmware version information to the power adapter. The power adapter can also automatically transmit the request message for querying the firmware version information to the server. The server transmits the update firmware version information to the power adapter according to the request message. The embodiment of the present disclosure is not limited to these.

The MCU 130 is configured to determine whether to upgrade the firmware according to the update firmware version information.

Specifically, the MCU 130 determines whether to upgrade the firmware by comparing a local MCU firmware version number with a MCU firmware version number of the update firmware version information transmitted by the server. When a version level of the update firmware version information transmitted by the server is higher than that of the local MCU firmware version number, the MCU 130 determines to upgrade the firmware, and otherwise, the MCU 130 determines not to upgrade the firmware.

The radio frequency unit 110 is configured to transmit the first request message to the server via the antenna 120 when the MCU 130 determines to upgrade the firmware.

Specifically, when the power adapter determines to upgrade the firmware, the power adapter transmits the first request message for requesting the firmware upgrade data to the server, and the power adapter enters an upgrade mode. Specifically, the MCU 130 of the power adapter enters a firmware upgrade mode, and is ready to receive the firmware upgrade data from the server.

It can be further understood that the MCU 130 is further configured to update functions of the power adapter according to the firmware upgrade data downloaded from the server, so as to cause the power adapter to have different work modes and charge the terminal in an updated work mode.

Optionally, in the embodiment of the present disclosure, the MCU 130 is configured to determine to upgrade the firmware when it is determined that the version level of the firmware is lower than that of the update firmware version information, and determine not to upgrade the firmware when it is determined that the version level of the firmware is not lower than that of the update firmware version information.

Optionally, in the embodiment of the present disclosure, the radio frequency unit 110 is configured to transmit a second request message for querying firmware version information to the server via the antenna 120 to obtain the update firmware version information.

Optionally, in the embodiment of the present disclosure, the radio frequency unit 110 is configured to transmit the received firmware upgrade data to the server via the antenna 120, so as to cause the server to perform data verification. The radio frequency unit 110 is further configured to receive an indication message from the server, and the indication message is configured to indicate that the data verification is successful.

Specifically, after the power adapter receives the firmware upgrade data from the sever, in other words, after the MCU of the power adapter downloads the firmware upgrade data from the server, the power adapter returns the downloaded firmware upgrade data to the server, and the server verifies the downloaded firmware upgrade data. When the server determines that the firmware upgrade data is right, the server informs the power adapter that the firmware upgrade data is successfully downloaded. At this point, the power adapter finishes the firmware upgrade operation.

Optionally, in the embodiment of the present disclosure, after the power adapter finishes the firmware upgrade operation, the power adapter can exit the upgrade mode and returns to a standard charging mode.

From the above, in the embodiment of the present disclosure, by adding the radio frequency unit and the antenna to the power adapter, the power adapter can be connected to a network, such that the power adapter can flexibly and efficiently obtain the update MCU firmware version information to finish the MCU firmware upgrade operation. After the power adapter is sold to a user, the power adapter can upgrade the MCU firmware via a network, which solves a problem of the present technology that the user complains and returns the power adapter to a factory when a software bug occurs, and solves a problem of the present technology that manpower waste, material resources waste, and a waste of money are caused by returning the power adapter to the factory for repair. Therefore, the power adapter and the method for upgrading the power adapter in the embodiment of the present disclosure can upgrade the MCU firmware flexibly, and can also effectively enhance user satisfactory.

Figure 2:
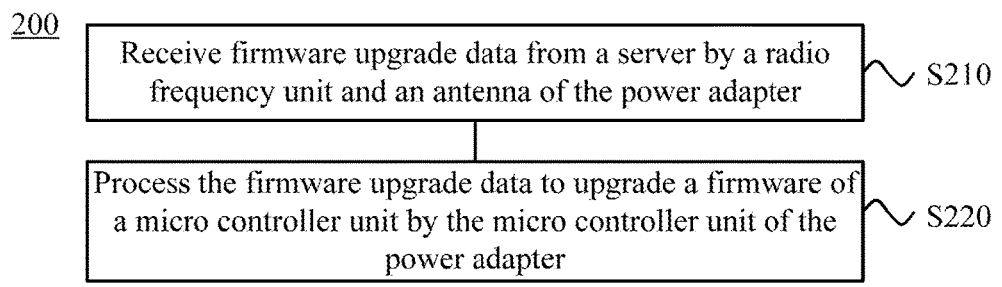
FIG. 2 is a schematic flow chart of a method for upgrading a power adapter in accordance with an embodiment of the present disclosure.

FIG. 2 is a schematic flow chart of a method 200 for upgrading a power adapter in accordance with an embodiment of the present disclosure. The method 200 is executed by the power adapter. The power adapter includes a radio frequency unit and an antenna, and further includes a MCU and a charging interface. The method 200 includes following.

S210, the power adapter receives firmware upgrade data from a server via the radio frequency unit and the antenna.

Specifically, in the embodiment of the present disclosure the firmware refers to a MCU firmware, that is, the firmware upgrade data is MCU firmware upgrade data.

S220, the power adapter processes the firmware upgrade data via the MCU to upgrade a firmware of the MCU.

Specifically, the power adapter stores the received firmware upgrade data in a corresponding site to realize upgrade of the firmware.

It can be understood that in the embodiment of the present disclosure the server refers to a server which can provide network service for the power adapter. Specifically, the server can be an existing server, and the embodiment of the present disclosure does not limit the server to be a specific server.

In the embodiment of the present disclosure, the power adapter upgrades the firmware via the firmware upgrade data transmitted by the server. That is, in the embodiment of the present disclosure, the firmware of the MCU of the power adapter is upgraded via a network, thus a problem of the present technology that the power adapter needs to be returned to a factory for repairing when a software bug occurs can be avoided, which can enhance user satisfaction.

It can be understood that in the embodiment of the present disclosure, the firmware of the MCU of the power adapter can be upgraded online, which is similar to that a mobile phone is upgraded via over-the-air (OTA) technology. It can be understood that the OTA upgrade is a standard software upgrade manner provided by the Android system, and is a lossless upgrade system. For the OTA upgrade, an OTA upgrade pack is automatically downloaded via a network, for example WIFI or 3G network, to perform automatic upgrade. For the OTA upgrade, the OTA upgrade pack can also be downloaded into a memory card to perform upgrade, for example, the OTA upgrade pack is downloaded into a secure digital memory card to perform upgrade.

Figure 2A:
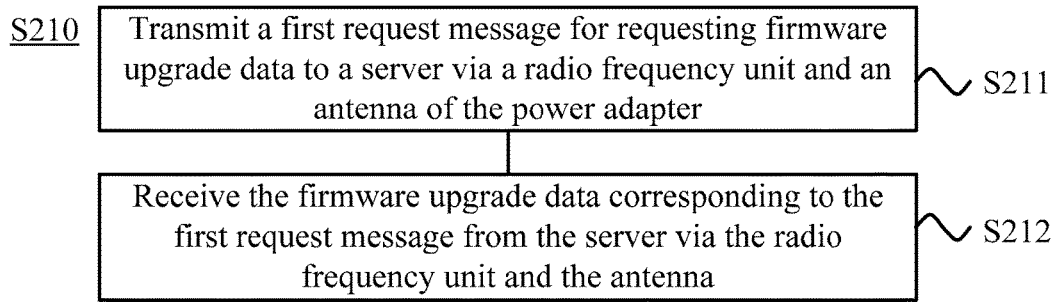
FIG. 2A is a flow chart illustrating S210 of FIG. 2 in accordance with an embodiment of the present disclosure.

Optionally, in the embodiment of the present disclosure, as illustrated in FIG. 2A, in S210, receiving the firmware upgrade data from the server by the radio frequency unit and the antenna of the power adapter includes following.

S211, the power adapter transmits a first request message for requesting the firmware upgrade data to the server via the radio frequency unit and the antenna.

S212, the power adapter receives the firmware upgrade data corresponding to the first request message from the server via the radio frequency unit and the antenna.

Specifically, for example when the power adapter requests the firmware upgrade data corresponding to the latest firmware version number from the server, according to the request from the power adapter, the server returns the firmware upgrade data corresponding to the latest firmware version number to the power adapter.

Figure 2B:
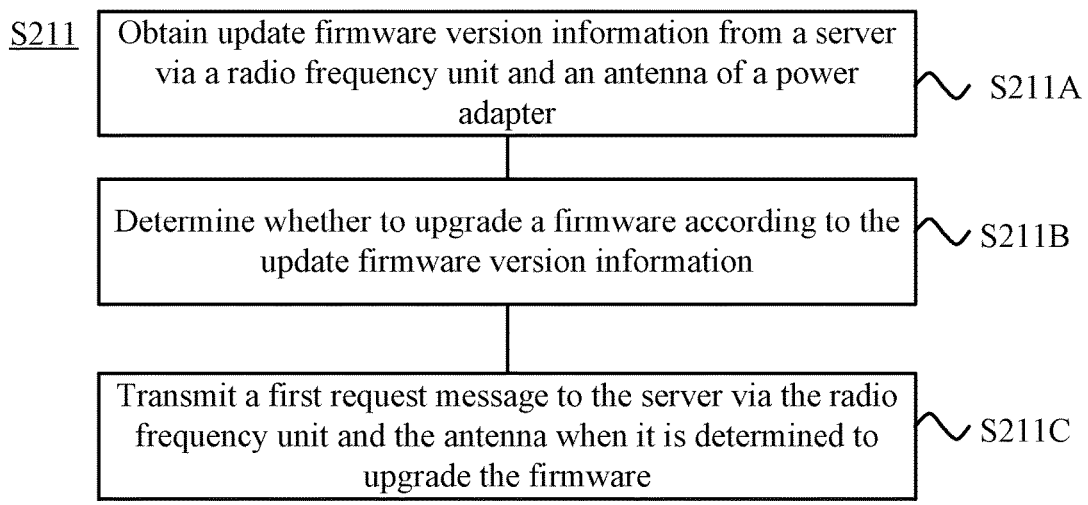
FIG. 2B is a flow chart illustrating S211 of FIG. 2A in accordance with an embodiment of the present disclosure.

Optionally, in the embodiment of the present disclosure, as illustrated in FIG. 2B, in S211, transmitting the first request message for requesting the firmware upgrade data to the server by the radio frequency unit and the antenna of the power adapter includes following.

S211A, the power adapter obtains update firmware version information from the server via the radio frequency unit and the antenna.

The server can automatically transmit the update firmware version information to the power adapter. The power adapter can also automatically transmit the request message for querying the firmware version information to the server. The server transmits the update firmware version information to the power adapter according to the request message. The embodiment of the present disclosure is not limited to these.

Optionally, in the embodiment of the present disclosure, in S211A, obtaining the update firmware version information from the server by the radio frequency unit and the antenna of the power adapter includes following.

The power adapter transmits a second request message for querying firmware version information to the server via the radio frequency unit and the antenna, and obtains the update firmware version information via the radio frequency unit and the antenna.

Specifically, in the embodiment of the present disclosure, the firmware version information is a firmware version number. In the embodiment of the present disclosure, the update firmware version information is the latest MCU firmware version number transmitted by the server.

S211B, the power adapter determines whether to upgrade the firmware according to the update firmware version information.

Specifically, the power adapter determines whether to upgrade the firmware by comparing a local MCU firmware version number with a MCU firmware version number of the update firmware version information transmitted by the server. When a version level of the update firmware version information transmitted by the server is higher than that of the local MCU firmware version number, the power adapter determines to upgrade the firmware, and otherwise, the power adapter determines not to upgrade the firmware.

Optionally, in the embodiment of the present disclosure, in S211B, determining, by the power adapter, whether to upgrade the firmware according to the update firmware version information includes: determining to upgrade the firmware when it is determined that a version level of the firmware is lower than that of the update firmware version information, and determining not to upgrade the firmware when it is determined that the version level of the firmware is not lower than that of the update firmware version information.

S211C, the power adapter transmits the first request message to the server via the radio frequency unit and the antenna when it is determined to upgrade the firmware.

Specifically, when the power adapter determines to upgrade the firmware, the power adapter transmits the first request message for requesting the firmware upgrade data to the server, and the power adapter enters an upgrade mode. Specifically, the MCU of the power adapter enters a firmware upgrade mode, and is ready to receive the firmware upgrade data from the server.

Figure 2C:
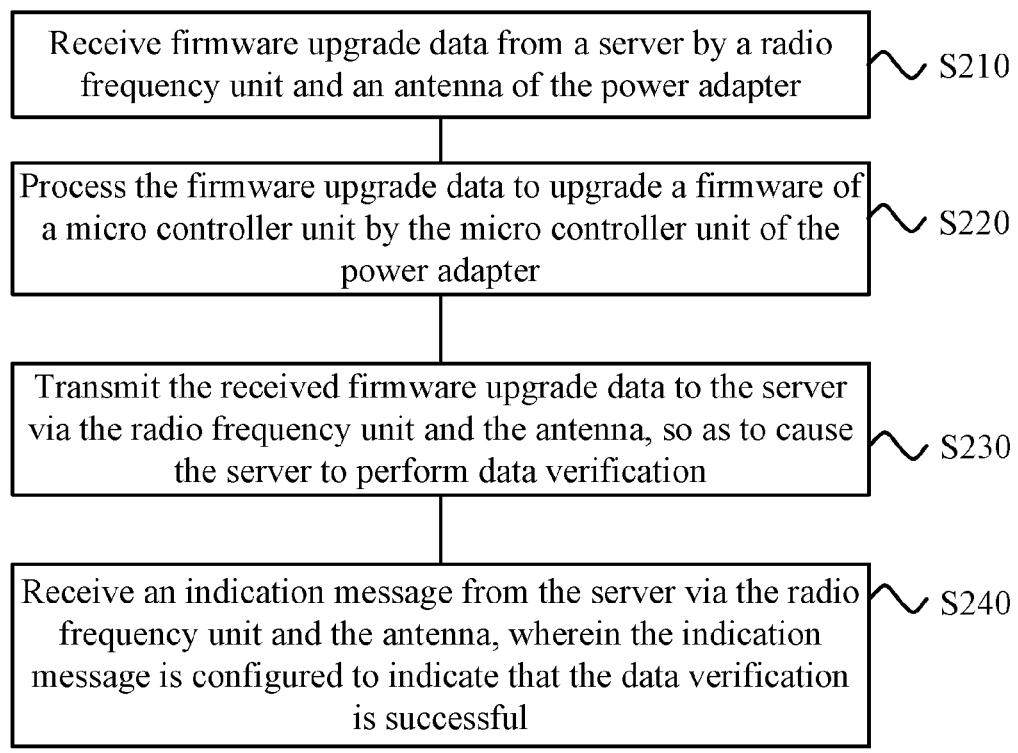
FIG. 2C is another flow chart of a method for upgrading a power adapter in accordance with an embodiment of the present disclosure.

Optionally, in the embodiment of the present disclosure, as illustrated in FIG. 2C, the method 200 further includes following.

S230, the power adapter transmits the received firmware upgrade data to the server via the radio frequency unit and the antenna, so as to cause the server to perform data verification.

S240, the power adapter receives an indication message from the server via the radio frequency unit and the antenna, and the indication message is configured to indicate that the data verification is successful.

Specifically, after the power adapter receives the firmware upgrade data from the sever, in other words, after the MCU of the power adapter downloads the firmware upgrade data from the server, the power adapter returns the downloaded firmware upgrade data to the server, and the server verifies the firmware upgrade data. When the server determines that the firmware upgrade data is right, the server informs the power adapter that the firmware upgrade data is successfully downloaded. At this point, the power adapter can finish the firmware upgrade operation.

Optionally, in the embodiment of the present disclosure, after the power adapter finishes the firmware upgrade operation, the power adapter can exit the upgrade mode and returns to a standard charging mode.

In the embodiment of the present disclosure, the power adapter includes the radio frequency unit and the antenna, and the power adapter can communicate with the server via a network, so as to obtain the updated firmware upgrade data to upgrade the firmware. That is, in the embodiment of the present disclosure, the firmware of the MCU of the power adapter is upgraded via a network, thus a problem of the present technology that the power adapter needs to be returned to a factory for repair when a software bug occurs can be avoided, which can enhance user satisfactory.

Figure 3:
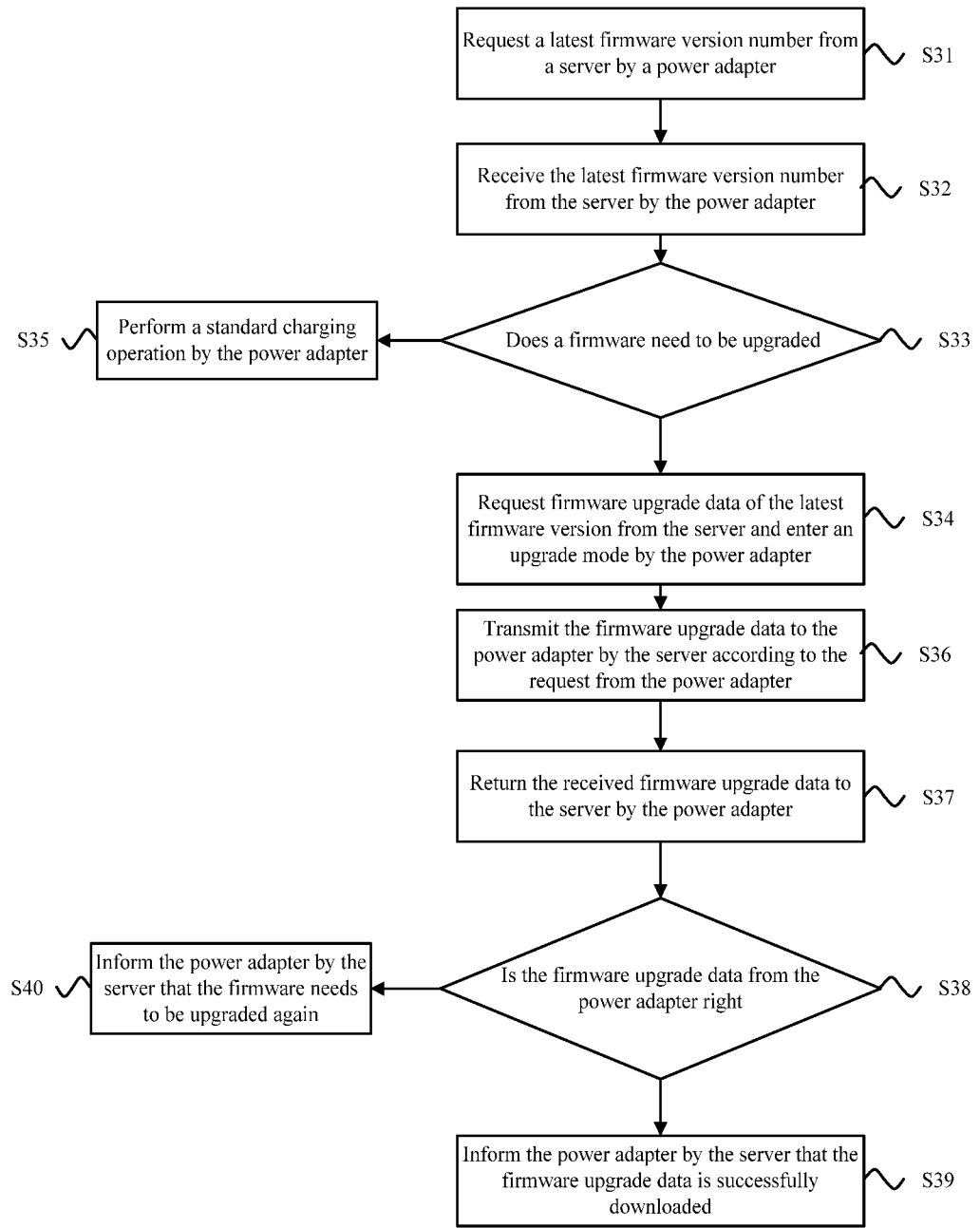
FIG. 3 is another schematic flow chart of a method for upgrading a power adapter in accordance with an embodiment of the present disclosure.

FIG. 3 is another schematic flow chart of a method for upgrading a power adapter in accordance with an embodiment of the present disclosure. In S31, the power adapter requests a latest firmware version number from a server. In S32, the power adapter receives the latest firmware version number from the server. In S33, a MCU of the power adapter determines whether to upgrade a firmware of the MCU according to the latest firmware version number transmitted by the server. Specifically, when it is determined that a version level of the firmware is lower than that of the latest firmware version number, it is determined that the firmware needs to be upgraded, and S34 is executed. When it is determined that the version level of the firmware is not lower than that of the latest firmware version number, it is determined that the firmware does not need to be upgraded, and S35 is executed. In S34, the power adapter requests firmware upgrade data of the latest firmware version from the server, and enters an upgrade mode. In S36, the server transmits the firmware upgrade data to the power adapter according to the request from the power adapter. Specifically, after the server receives the request from the power adapter for a period, the server prepares the firmware upgrade data, and transmits the firmware upgrade data to the power adapter. In S37, the power adapter receives the firmware upgrade data from the server, and returns the received firmware upgrade data to the server. In S38, the server verifies the firmware upgrade data from the power adapter to determine whether the firmware upgrade data from the power adapter is right. If the firmware upgrade data from the power adapter is right, S39 is executed, and otherwise, S40 is executed. In S39, the server informs the power that the firmware upgrade data is successfully downloaded. In S40, the server informs the power adapter that the firmware needs to be upgraded again, that is, the firmware upgrade data needs to be downloaded again until the server determines that the firmware upgrade data from the power adapter is right. In S35, when it is determined that a version level of the firmware is not lower than that of the latest firmware version number, it is determined that the firmware does not need to be upgraded, and the power adapter can charge a terminal in a standard charging mode.

In the embodiment of the present disclosure, the power adapter includes the radio frequency unit and the antenna, thus the power adapter can communicate with the server via a network, so as to obtain updated firmware upgrade data to upgrade the firmware. That is, in the embodiment of the present disclosure, the firmware of the MCU of the power adapter is upgraded via a network, thus a problem of the present technology that the power adapter needs to be returned to a factory for repairing when a software bug occurs can be avoided, which can enhance user satisfaction.

It should be understood that in the present disclosure, the term "the first", "the second", "the third", "the fourth", and various callouts are used for simple description, and not used to limit the scope of the embodiments of the present disclosure.

It should be understood that in the present disclosure, the term "and/or" are used to describe association relationship of association objects, and indicates that there can be three relationships. For example, A and/or B can indicate that there is only A, there are A and B, and there is only B. Additionally, in the present disclosure, the symbol of "/" generally indicates the relationship of "or" between association objects.

It should be understood that in various embodiments of the present disclosure, the sequence numbers of the above processes do not indicate an execution order. The execution order of the above processes is determined according to functions and interior logic relationship of the above processes, and should not limit implementation process of the embodiments of the present disclosure.

Those skilled in the art should appreciate that units and programming steps of various examples described in the embodiments of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method embodiments can be referred, which will not be repeated herein.

In several embodiments provided by the present disclosure, it can be understood that the disclosed systems, devices, and methods can be implemented by other manners. For example, the device embodiments described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the embodiments.

Additionally, various functional units in the embodiments of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various embodiments of the present disclosure. The storage mediums described above include a U disk, a mobile disk, a read-only memory (ROM), a random access memory (RAM), a disc, a compact disc, or other medium storing program codes.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A power adapter comprising:
   a radio frequency unit;
   a micro controller unit configured to:
      determine whether to upgrade a firmware of the micro controller unit,
      transmit, when the micro controller unit determines to upgrade the firmware of the micro controller unit, a request for requesting firmware upgrade data to a server via the radio frequency unit and an antenna,
      control the power adapter to switch to a firmware upgrade mode from a standard charging mode upon transmission of the request,
      receive the firmware upgrade data from the server to upgrade the firmware of the micro controller unit in the firmware upgrade mode, and control the power adapter to switch to the standard charging mode from the firmware upgrade mode upon finish of firmware upgrade; and a charging interface configured to charge a terminal in the standard charging mode.

2. The power adapter of claim 1, wherein the radio frequency unit is configured to obtain update firmware version information from the server via the antenna;

and the micro controller unit is configured to determine whether to upgrade the firmware according to the update firmware version information.

3. The power adapter of claim 2, wherein the micro controller unit is configured to determine to upgrade the firmware when it is determined that a version level of the firmware is lower than that of the update firmware version information, and determine not to upgrade the firmware when it is determined that the version level of the firmware is not lower than that of the update firmware version information.

4. The power adapter of claim 3, wherein the radio frequency unit is configured to transmit another message for querying firmware version information to the server via the antenna to obtain the update firmware version information.

5. The power adapter of claim 2, wherein the radio frequency unit is configured to transmit another request for querying firmware version information to the server via the antenna to obtain the update firmware version information.

6. The power adapter of claim 1, wherein the radio frequency unit is configured to transmit the received firmware upgrade data to the server via the antenna, so as to cause the server to perform data verification; and the radio frequency unit is further configured to receive an indication message from the server, and the indication message is configured to indicate that the data verification is successful.

7. A method for upgrading a power adapter, the power adapter comprising:

a radio frequency unit, an antenna, a micro controller unit, and a charging interface, the method comprising:

determining, by the micro controller unit, whether to upgrade a firmware of the micro controller unit;

transmitting, by the micro controller unit, a request for requesting firmware upgrade data to a server via the radio frequency unit and the antenna when the micro controller unit determines to upgrade the firmware of the micro controller unit;

controlling, by the micro controller unit, the power adapter to switch to a firmware upgrade mode from a standard charging mode upon transmission of the request;

receiving, by the micro controller unit, the firmware upgrade data from the server to upgrade the firmware of the micro controller unit in the firmware upgrade mode;

controlling, by the micro controller unit, the power adapter to switch to the standard charging mode from the firmware upgrade mode upon finish of firmware upgrade; and charging, by the charging interface, a terminal in the standard charging mode.

8. The method of claim 7, wherein transmitting, via the radio frequency unit and the antenna of the power adapter, the request for requesting the firmware upgrade data to the server comprises:

obtaining, by the radio frequency unit and the antenna of the power adapter, update firmware version information from the server;

determining, by the power adapter, whether to upgrade the firmware according to the update firmware version information; and transmitting, by the radio frequency unit and the antenna of the power adapter, the request to the server when the power adapter determines to upgrade the firmware.

9. The method of claim 8, wherein determining, by the power adapter, whether to upgrade the firmware according to the update firmware version information comprises:

determining to upgrade the firmware when it is determined that a version level of the firmware is lower than that of the update firmware version information; and determining not to upgrade the firmware when it is determined that the version level of the firmware is not lower than that of the update firmware version information.

10. The method of claim 9, wherein obtaining, by the radio frequency unit and the antenna of the power adapter, the update firmware version information from the server comprises:

transmitting, by the radio frequency unit and the antenna of the power adapter, another request for querying firmware version information to the server; and obtaining, by the radio frequency unit and the antenna of the power adapter, the update firmware version information.

11. The method of claim 8, wherein obtaining, by the radio frequency unit and the antenna of the power adapter, the update firmware version information from the server comprises:

transmitting, by the radio frequency unit and the antenna of the power adapter, another request for querying firmware version information to the server; and obtaining, by the radio frequency unit and the antenna of the power adapter, the update firmware version information.

12. The method of claim 7, wherein the method further comprises:

transmitting, by the radio frequency unit and the antenna of the power adapter, the received firmware upgrade data to the server, so as to cause the server to perform data verification; and receiving, by the radio frequency unit and the antenna of the power adapter, an indication message from the server, wherein the indication message is configured to indicate that the data verification is successful.

13. A power adapter comprising:

a radio frequency unit;

an antenna;

a micro controller unit configured to:

determine whether to update a firmware of the micro controller unit according to upgrade firmware version information received from a server via the radio frequency unit and the antenna, transmit, when the micro controller unit determines to upgrade the firmware of the micro controller unit, a request for requesting firmware upgrade data to a server via the radio frequency unit and the antenna, control the power adapter to switch to a firmware upgrade mode from a standard charging mode upon transmission of the request, receive the firmware upgrade data from the server to upgrade the firmware in the firmware upgrade mode; and a charging interface configured to charge a terminal in the standard charging mode.

14. The power adapter of claim 13, wherein the micro controller unit is configured to determine to upgrade the firmware when it is determined that a version level of the firmware is lower than that of the update firmware version information, and determine not to upgrade the firmware when it is determined that the version level of the firmware is not lower than that of the update firmware version information.

15. The power adapter of claim 13, wherein the radio frequency unit is configured to transmit another request for querying firmware version information to the server via the antenna to obtain the update firmware version information.

16. The power adapter of claim 13, wherein the radio frequency unit is configured to transmit the received firmware upgrade data to the server via the antenna, so as to cause the server to perform data verification; and the radio frequency unit is further configured to receive an indication message from the server, and the indication message is configured to indicate that the data verification is successful.

\* \* \* \* \*